United States Patent
Nasu et al.

(10) Patent No.: US 10,611,260 B2
(45) Date of Patent: Apr. 7, 2020

(54) DRIVE FORCE CONTROL SYSTEM

(71) Applicant: TOYOTA JIDOSHA KABUSHIKI KAISHA, Toyota-shi, Aichi (JP)

(72) Inventors: Takanobu Nasu, Sagamihara (JP); Hiroshi Isono, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 15/957,155

(22) Filed: Apr. 19, 2018

(65) Prior Publication Data

US 2018/0334053 A1 Nov. 22, 2018

(30) Foreign Application Priority Data

May 16, 2017 (JP) .................................. 2017-097135

(51) Int. Cl.
*B60L 15/20* (2006.01)
*B60L 3/00* (2019.01)

(52) U.S. Cl.
CPC ........... *B60L 15/2036* (2013.01); *B60L 3/003* (2013.01); *B60L 3/0061* (2013.01); *B60L 15/2054* (2013.01); *B60L 2220/46* (2013.01); *B60L 2240/16* (2013.01); *B60L 2240/24* (2013.01); *B60L 2240/423* (2013.01); *B60L 2240/461* (2013.01); *B60L 2240/507* (2013.01)

(58) Field of Classification Search
CPC ................................................ B60L 15/2036
See application file for complete search history.

(56) References Cited

U.S. PATENT DOCUMENTS

| 6,024,182 | A | * | 2/2000 | Hamada | B60K 1/00 180/6.28 |
| 6,125,953 | A | * | 10/2000 | Arai | B60K 6/365 180/6.28 |
| 9,154,060 | B2 | * | 10/2015 | Noguchi | B60K 6/52 |
| 9,623,867 | B2 | * | 4/2017 | Ashizawa | B60W 20/19 |
| 10,065,645 | B2 | * | 9/2018 | Zou | B60W 30/18027 |
| 10,179,507 | B2 | * | 1/2019 | Terayama | B60L 58/14 |
| 2006/0037792 | A1 | * | 2/2006 | Boss | B60K 1/02 180/65.6 |
| 2013/0030636 | A1 | | 1/2013 | Sugata | |
| 2016/0068159 | A1 | | 3/2016 | Zou | |

FOREIGN PATENT DOCUMENTS

| JP | 2013-255357 A | 12/2013 |
| JP | 2016-059269 A | 4/2016 |
| WO | 2011/125117 A1 | 10/2011 |

* cited by examiner

*Primary Examiner* — Bao Long T Nguyen
*Assistant Examiner* — Michael A Berns
(74) *Attorney, Agent, or Firm* — Oliff PLC (57) ABSTRACT

A drive force control system that ensures a running stability and a driving performance of a vehicle even in the event of failure of one of motors. The drive force control system determines that one of the right motor and the left motor cannot generate a required torque due to failure. In the event of failure of any one of the motors, the drive force control system generates a torque by the other motor working properly, and controls the torque transmitting capacity of the clutch in such a manner as to deliver the output torque of the motor working properly to the wheel coupled to the faulty motor.

10 Claims, 8 Drawing Sheets

DRIVE FORCE CONTROL SYSTEM

CROSS REFERENCE TO RELATED APPLICATION

The present disclosure claims the benefit of Japanese Patent Application No. 2017-097135 filed on May 16, 2017 with the Japanese Patent Office, the disclosure of which is incorporated herein by reference in its entirety.

BACKGROUND

Field of the Disclosure

Embodiments of the present application relate to the art of a control system for controlling drive force of a vehicle in which a motor is individually connected to each drive wheel.

Discussion of the Related Art

JP-A-2016-59269 describes an example of a drive force control system comprising motors connected to a right drive wheel and a left drive wheel respectively, and a friction clutch that enables torque transmission between the right drive wheel and the left drive wheel. The drive force control system taught by JP-A-2016-59269 is configured to control a torque transmitting capacity of the friction clutch depending on a road condition. The drive force control system taught by JP-A-2016-59269 is further configured to determine whether to power the vehicle by one of the motors or by both of the motors and to determine whether to operate each of the motors as a motor or a generator, depending on a road condition and a vehicle speed. Specifically, in the suburban area, the drive force control system taught by JP-A-2016-59269 propels the vehicle by one of the motors at a low speed, and propels the vehicle by both of the motors at a mid to high vehicle speed.

However, if a failure occurs in one of the motors of the drive force control system taught by JP-A-2016-59269 while propelling the vehicle by both of the motors, a required drive force may not be achieved. In this case, specifically, drive torques applied to each wheel may become imbalanced and hence a running stability and a driving performance would be reduced.

SUMMARY

Aspects of embodiments of the present application have been conceived noting the foregoing technical problems, and it is therefore an object of embodiments of the present disclosure is to provide a drive force control system that ensures a running stability and a driving performance of a vehicle even in the event of failure of one of motors.

The embodiment of the present disclosure relates to a drive force control system comprising: a right motor coupled to a right wheel of a vehicle; a left motor coupled to a left wheel of the vehicle; a clutch that allows a torque transmission between the right motor and the left motor, in which a torque transmitting capacity is variable; and a controller that controls output torques of the right motor and the left motor. In order to achieve the above-explained objective, according to the embodiment of the present disclosure, the controller is configured to: determine that one of the right motor and the left motor cannot generate a required torque due to failure; generate a torque by the other one of the right motor and the left motor in the event of failure of said one of the right motor and the left motor; and control the torque transmitting capacity of the clutch in such a manner as to deliver the output torque of the motor working properly at least partially to the wheel coupled to the faulty motor.

In a non-limiting embodiment, the controller may be further configured to: calculate the output torque of the motor working properly based on a total value of a required torque of the right wheel and a required torque of the left wheel in a case that a difference between the required torque of the right wheel and the required torque of the left wheel is smaller than a predetermined value; and set the torque transmitting capacity of the clutch in such a manner as to distribute the output torque of the motor working properly equally to the right wheel and to the left wheel.

In a non-limiting embodiment, the controller may be further configured to: determine whether the required torque of the wheel coupled to the faulty motor is smaller than the required torque of the wheel coupled to the motor working properly; calculate the output torque of the motor working properly based on a total value of the required torque of the right wheel and the required torque of the left wheel in a case that the required torque of the wheel coupled to the faulty motor is smaller than the required torque of the wheel coupled to the motor working properly; and set the torque transmitting capacity of the clutch based on the required torque of the wheel coupled to the faulty motor.

In a non-limiting embodiment, the controller may be further configured to: determine whether the required torque of the wheel coupled to the faulty motor is greater than the required torque of the wheel coupled to the motor working properly; execute a pulse control to generate a high torque and a low torque alternately by the motor working properly in a case that the required torque of the wheel coupled to the faulty motor is greater than the required torque of the wheel coupled to the motor working properly; and execute an intermittent control to increase the torque transmitting capacity of the clutch when the motor working properly generates the high torque, and reduce the torque transmitting capacity of the clutch when the motor working properly generates the low torque.

In a non-limiting embodiment, the high torque may include a torque obtained by multiplying the required torque of the wheel coupled to the faulty motor by predetermined times.

In a non-limiting embodiment, the low torque may include a torque lower than the required torque of the wheel coupled to the motor working properly.

In a non-limiting embodiment, the low torque may include a negative torque that reduces a rotational speed of the wheel coupled to the motor working properly.

In a non-limiting embodiment, the controller may be further configured to calculate the low torque based on the required torque and an inertia torque of the wheel coupled to the motor working properly.

In a non-limiting embodiment, the pulse control may include a control to periodically shift the output torque of the motor working properly among the high torque, the low torque, and the required torque of the wheel coupled to the motor working properly.

In a non-limiting embodiment, the right wheel may include a right rear wheel, and the left wheel may include a left rear wheel.

In a non-limiting embodiment, the controller may be further configured to guard the output torque of the motor working properly by an upper limit value and a lower limit value.

Thus, according to the embodiment of the present disclosure, the drive force control system determines that one of the right motor and the left motor cannot generate a required torque due to failure. In the event of failure of any one of the motors, the drive force control system generates a torque by the other motor working properly. In this situation, the torque transmitting capacity of the clutch is controlled in such a manner as to deliver the output torque of the motor working properly at least partially to the wheel coupled to the faulty motor. According to the embodiment of the present disclosure, therefore, the actual drive torques delivered to the pair of wheels coupled respectively to the pair of motors including the faulty motor will not be changed significantly from the required torques even in the event of failure of one of the motors in the pair of motors. For this reason, the running stability and the driving performance of the vehicle can be ensured.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
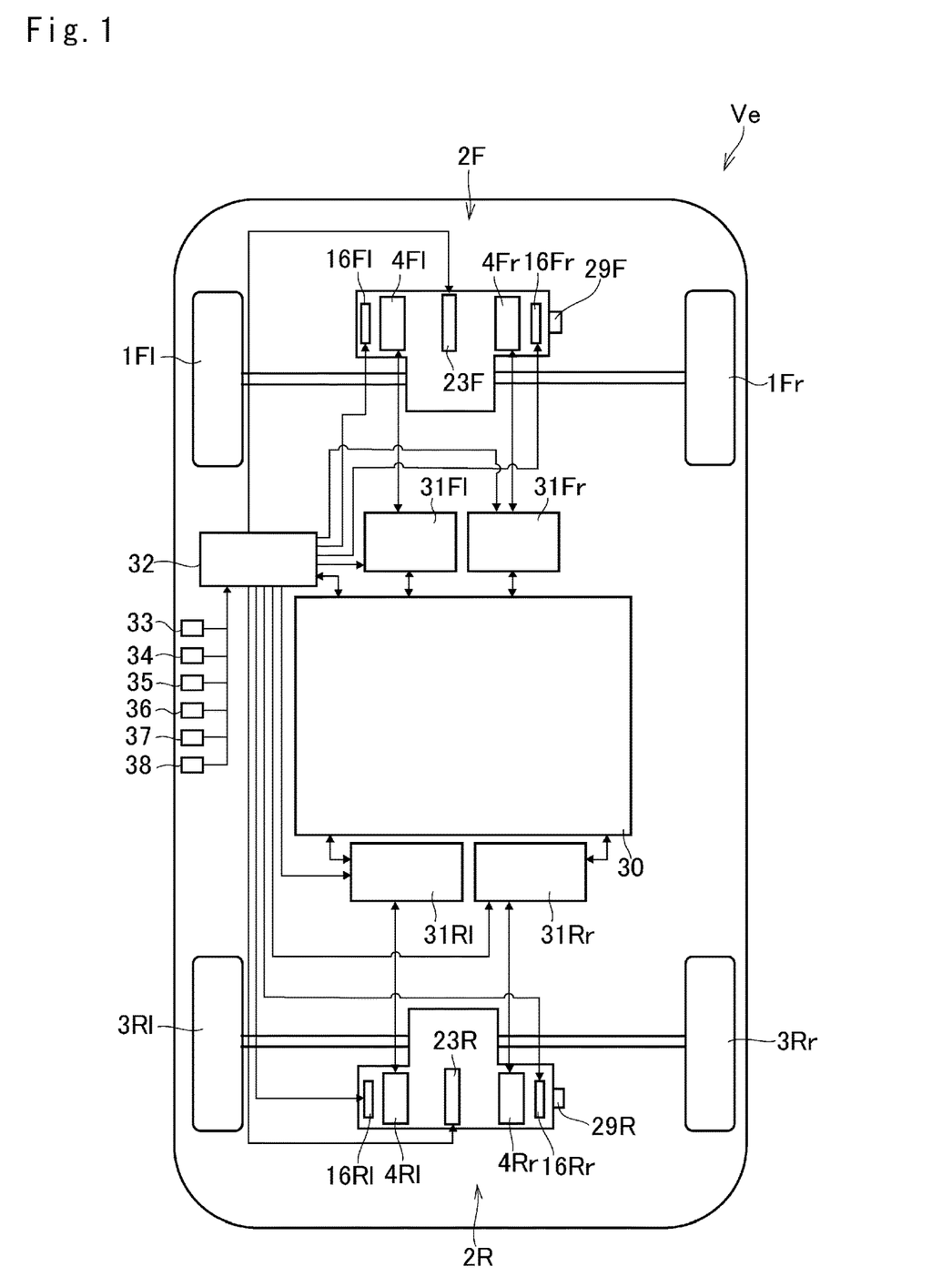
FIG. 1 is a schematic illustration showing one example of a vehicle to which the drive force control system according to the embodiment is applied.

An embodiment of the present disclosure will now be explained with reference to the accompanying drawings. Turning now to FIG. 1, there is shown one example of a vehicle to which a drive force control system according to the embodiment is applied. A vehicle Ve shown in FIG. 1 as a four-wheel drive vehicle comprises a front drive unit 2F that delivers torque to a pair of front wheels 1Fr and 1Fl, and a rear drive unit 2R that delivers torque to a pair of rear wheels 3Rr and 3Rl. The front drive unit 2F and the rear drive unit 2R are arranged substantially symmetrical across the longitudinal center of the vehicle Ve. In the following explanation, therefore, only a configuration of the front drive unit 2F will be explained, and detailed explanation for the rear drive unit 2R will be omitted.

Figure 2:
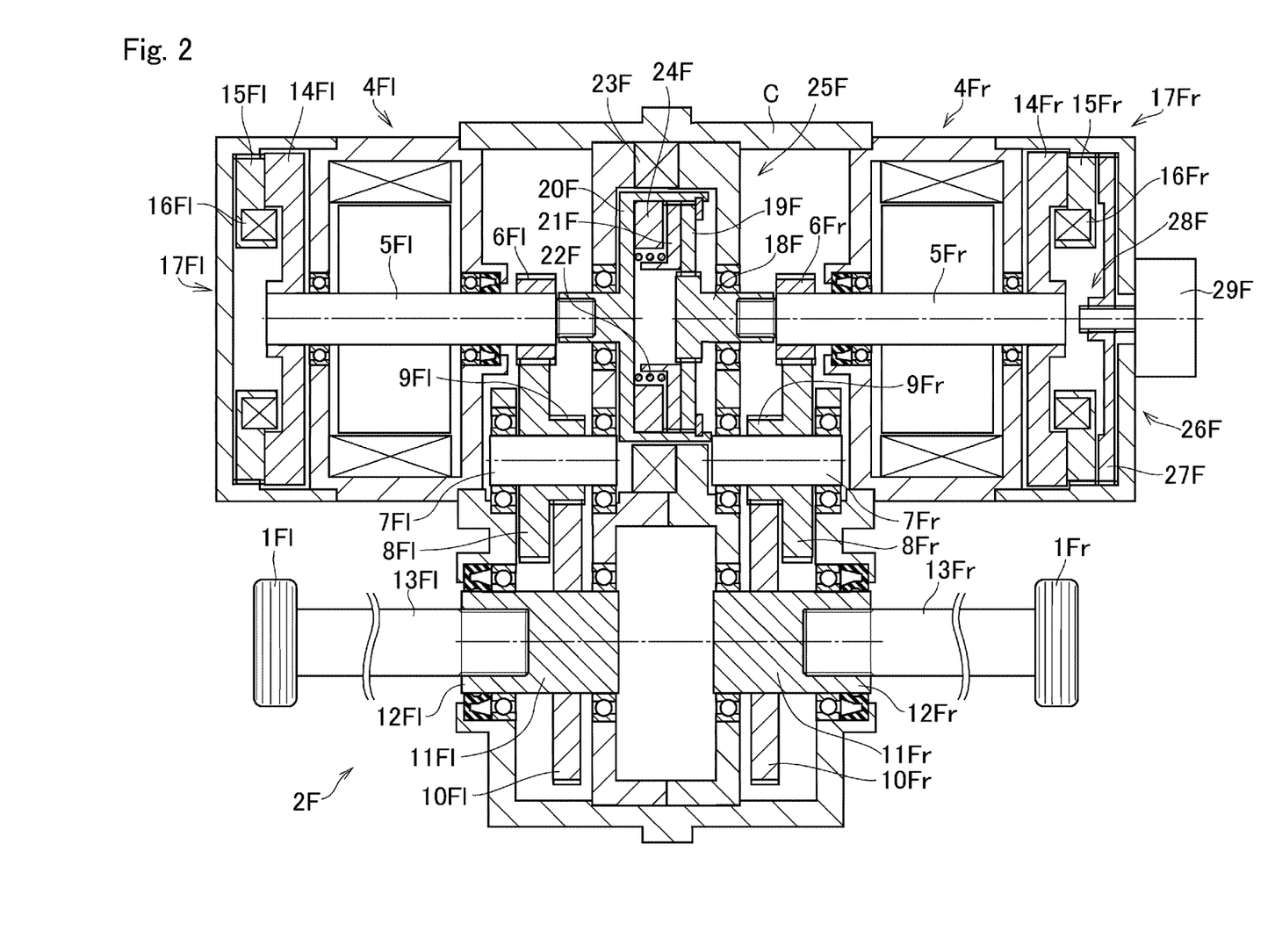
FIG. 2 is a cross-sectional view showing one example of a drive unit according to the embodiment.

A cross-section of the front drive unit 2F is shown in FIG. 2. A prime mover of the front drive unit 2F includes a right front motor 4Fr coupled to the right front wheel 1Fr, and a left front motor 4Fl coupled to the left front wheel 1Fl. For example, a motor-generator such as a permanent magnet synchronous motor may be employed respectively as the right front motor 4Fr and the left front motor 4Fl.

In the right half of the front drive unit 2F, a right output gear 6Fr is fitted onto a laterally inner end of a right output shaft 5Fr of the right front motor 4Fr extending widthwise, and a right counter driven gear 8Fr that is diametrically larger than the right output gear 6Fr is fitted onto a laterally outer portion of a right countershaft 7Fr extending parallel to the right output shaft 5Fr. A right drive gear 9Fr that is diametrically smaller than the right counter driven gear 8Fr is also fitted onto a laterally inner portion of the right countershaft 7Fr to be meshed with a right driven gear 10Fr that is diametrically larger than the right drive gear 9Fr. Likewise, in the left half of the front drive unit 2F, a left output gear 6Fl is fitted onto a laterally inner end of a left output shaft 5Fl of the left front motor 4Fr extending widthwise, and a left counter driven gear 8Fl that is diametrically larger than the left output gear 6Fl is fitted onto a laterally outer portion of a left countershaft 7Fl extending parallel to the left output shaft 5Fl. A left drive gear 9Fl that is diametrically smaller than the left counter driven gear 8Fl is also fitted onto a laterally inner portion of the left countershaft 7Fl to be meshed with a left driven gear 10Fl that is diametrically larger than the left drive gear 9Fl.

A right gear shaft 11Fr on which the right driven gear 10Fr is disposed also extends widthwise, and a right cylindrical portion 12Fr is formed on a laterally outer end of the right gear shaft 11Fr. A laterally inner end of a right driveshaft 13Fr is splined into the right cylindrical portion 12Fr of the right gear shaft 11Fr, and a laterally outer end of the right driveshaft 13Fr is coupled to the right front wheel 1Fr. Likewise, a left gear shaft 11Fl on which the left driven gear 10Fl is disposed also extends widthwise, and a left cylindrical portion 12Fl is formed on a laterally outer end of the left gear shaft 11Fl. A laterally inner end of a left driveshaft 13Fl is splined into the left cylindrical portion 12Fl of the left gear shaft 11Fl, and a laterally outer end of the left driveshaft 13Fl is coupled to the left front wheel 1Fl.

A disc-shaped right brake rotor 14Fr made of magnetic material is fitted onto a laterally outer end of the right output shaft 5Fr, and an annular right brake stator 15Fr is splined into a casing C while being opposed to the right brake rotor 14Fr so that the right brake stator 15Fr is allowed to move toward and away from the right brake rotor 14Fr but not allowed to rotate. The right brake stator 15Fr is provided with a right brake coil 16Fr so that the right brake stator 15Fr is brought into contact to the right brake rotor 14Fr by an electromagnetic force established by energizing the right brake coil 16Fr. Consequently, a frictional brake torque is applied to the right brake rotor 14Fr. Likewise, a disc-shaped left brake rotor 14Fl made of magnetic material is fitted onto a laterally outer end of the left output shaft 5Fl, and an annular left brake stator 15Fl is splined into the casing C while being opposed to the left brake rotor 14Fl so that the left brake stator 15Fl is allowed to move toward and away from the left brake rotor 14Fl but not allowed to rotate. The left brake stator 15Fl is provided with a left brake coil 16Fl so that the left brake stator 15Fl is brought into contact to the left brake rotor 14Fl by an electromagnetic force established by energizing the left brake coil 16Fl. Consequently, a frictional brake torque is applied to the left brake rotor 14Fl. Thus, the right brake stator 15Fr, the right brake rotor 14Fr, and the right brake coil 16Fr form a right front friction brake 17Fr, and the left brake stator 15Fl, the left brake rotor 14Fl, and the left brake coil 16Fl form a left front friction brake 17Fl.

An extension shaft 18F having a T-shaped cross-section is coupled to a laterally inner end of the right output shaft 5Fr, and an annular clutch disc 19F is fitted onto a diametrically-larger portion of the extension shaft 18F to be rotated integrally therewith.

A bottomed-cylindrical clutch drum 20F holding the clutch disc 19F in a hollow space is coupled to a laterally inner leading end of the left output shaft 5Fl.

An annular pressure plate 21F is interposed between a bottom face of the clutch drum 20F and the clutch disc 19F. The pressure plate 21F is made of magnetic material, and is splined into the clutch drum 20F to be rotated integrally with the clutch drum 20F.

A spring 22F is interposed between the bottom face of the clutch drum 20F and the pressure plate 21F to push the pressure plate 21F toward the clutch disc 19F.

A clutch coil 23F is provided on the outer side of the clutch drum 20F, and a yoke 24F is interposed between the clutch coil 23F and the spring 22F. The clutch coil 23F generates an electromagnetic attraction force by passage of an electric current so as to isolate the pressure plate 21F away from the clutch disc 19F against a spring force of the spring 22F.

The clutch disc 19F, the pressure plate 21F, the spring 20F, the clutch coil 23F, and the yoke 24F form an electromagnetic clutch (to be simply referred to as a front clutch hereinafter) 25F. When the clutch coil 23F is not energized, the pressure plate 21F is brought into contact to the clutch disc 19F by the spring force of the spring 22F to rotate integrally with the clutch disc 19F. When the clutch coil 23F is energized, a torque transmitting capacity between the clutch disc 19F and the pressure plate 21F is governed by the electric current applied to the clutch coil 23F.

Thus, the right front motor 4Fr and the left front motor 4Fl are allowed to rotate integrally while transmitting a torque therebetween by frictionally engaging the pressure plate 21F and the clutch disc 19F without energizing the clutch coil 23F. A torque transmitting capacity between the pressure plate 21F and the clutch disc 19F can be reduced by energizing the clutch coil 23F thereby allowing the right front motor 4Fr and the left front motor 4Fl to rotate relatively to each other.

The brake torque applied to the right front wheel 1Fr and the left front wheel 1Fl cannot be maintained when the power is off to park the vehicle. In order to maintain a frictional contact between the right brake rotor 14Fr and the right brake stator 15Fr thereby halting the right front wheel 1Fr and the left front wheel 1Fl even when the power is off, the front drive unit 2F is provided with a parking lock device 26F. Specifically, the parking lock device 26F comprises an annular movable plate 27F opposed to the right brake rotor 14Fr across the right brake stator 15Fr, a feed screw mechanism 28F, and a brake motor 29F that actuates the feed screw mechanism 28F.

The feed screw mechanism 28F is adapted to translate a rotary motion of the brake motor 29F into a linear motion thereby pushing the movable plate 27F toward the right brake stator 15Fr so as to bring the right brake stator 15Fr into frictional contact to the right brake rotor 14Fr. That is, the feed screw mechanism 28F keeps the right output shaft 5Fr stopping even when the power is off. Thus, the feed screw mechanism 28F generates forward thrust force by generating forward torque by the brake motor 29F, and the forward thrust force is applied to the right brake stator 15Fr. Consequently, the right brake stator 15Fr is frictionally engaged with the right brake rotor 14Fr to halt the right output shaft 5Fr. By contrast, the right output shaft 5Fr is allowed to rotate by generating a reverse torque by the brake motor 29F to withdraw the right brake stator 15Fr from the right brake rotor 14Fr. Consequently, the braking force for stopping the rotation of the right output shaft 5Fr is cancelled.

Specifically, reversed efficiency of the feed screw mechanism 28F to translate the linear motion into the rotational motion is adjusted to be lower than forward efficiency to translate the rotational motion into the linear motion. In the front drive unit 2F, therefore, the right output shaft 5Fr may be halted by pushing the movable plate 27 and the right brake stator 15Fr toward the right brake rotor 14Fr by the feed screw mechanism 28. Therefore, it is possible to keep stopping the right output shaft 5Fr by the parking lock device 26F even if the current supply to the right brake coil 16Fr and the brake motor 29 is stopped while halting the right output shaft 5Fr by the feed screw mechanism 28F.

When the vehicle is parked, the current supply to the clutch coil 23F is stopped and hence the front clutch 25F is brought into engagement. In this situation, therefore, rotation of the left output shaft 5Fl is also stopped by stopping the rotation of the right output shaft 5Fr by the parking lock device 26F. In other words, the brake torques applied to the right front wheels 1Fr and the left front wheel 1Fl can be maintained. The parking lock device 26F may be arranged in such a manner as to stop the rotation of the left output shaft 5Fl, or may be arranged in such a manner as to stop the rotation of the countershaft 7Fr or 7Fl.

As mentioned above, the rear drive unit 2R is also arranged in the rear section of the vehicle Ve shown in FIG. 1, and a configuration of the rear drive unit 2R is substantially identical to that of the front drive unit 2F.

The vehicle Ve shown in FIG. 1 is provided with a high-voltage power storage device 30 including a battery and a capacitor. Specifically, in the front drive unit 2F, an electric current is supplied from the power storage device 30 to the right front motor 4Fr, the left front motor 4Fl, the right front brake coil 16Fr, and the left front brake coil 16Fl. Likewise, in the rear drive unit 2R, an electric current is supplied from the power storage device 30 to a right rear motor 4Rr, a left rear motor 4Rl, a right front brake coil 16Rr, and a left front brake coil 16Rl. The power storage device 30 is charged with the power generated by the motors 4Fr, 4Fl, 4Rr, and 4Rl.

In the front section of the vehicle Ve, a right front inverter 31Fr is interposed between the right front motor 4Fr and the power storage device 30, and a left front inverter 31Fl is interposed between the left front motor 4Fl and the power storage device 30. Likewise, in the rear section of the vehicle Ve, a right rear inverter 31Rr is interposed between the right rear motor 4Rr and the power storage device 30, and a left rear inverter 31Rl is interposed between the left rear motor 4Rl and the power storage device 30. Each of the inverters 31Fr, 31Fl, 31Rr, and 31Rl is individually adapted to switch between direct current and alternate current, and to control values and frequencies of the current supplied to the motors 4Fr, 4Fl, 4Rr, and 4Rl. In the vehicle Ve, therefore, the motors 4Fr, 4Fl, 4Rr, and 4Rl may be controlled independently.

In order to integrally control the right front inverter 31Fr, the left front inverter 31Fl, the right rear inverter 31Rr, the left rear inverter 31Rl, the front clutch 25F, a rear clutch 25R, the right front friction brake 17Fr, the left front friction brake 17Fl, a right rear friction brake 17Rr, a left rear friction brake 17Rl and so on, the vehicle Ve is further provided with an electronic control unit (to be abbreviated as the "first ECU" hereinafter) 32 as a controller. The ECU 32 is composed mainly of microcomputer configured to execute a calculation based on an incident signal and data installed in advance, and to transmit a calculation result in the form of a command signal e.g., to the above-mentioned elements.

For example, the ECU 32 receives signals from an accelerator sensor 33 that detects a depression of an accelerator pedal, a brake pedal sensor 34 that detects a pedal force applied to a brake pedal or a depression of the brake pedal, a steering angle sensor 35 that detects a steering angle, an acceleration sensor 36 that detects longitudinal acceleration and lateral acceleration of the vehicle Ve, a yaw rate sensor 37 that detects a yaw rate of the vehicle Ve, and a wheel speed sensor 38 that detects rim speeds of the right front wheel 1Fr, the left front wheel 1Fl, the right rear wheel 3Rr, and the left rear wheel 3Rl. Specifically, the command signals to the inverters 31Fr, 31Fl, 31Rr, and 31Rl are computed while taking account of conventionally known Antilock Brake system (ABS), Traction Control (TRC), Electronic Stability Control (ESC), Dynamic Yaw rate Control (DYC), and the like.

In the event of failure of any one of the motors or inverters, a required torque may not be generated by the faulty motor or the motor connected to the faulty inverter. In other words, the required torque may not be generated by the motor even if a required current is supplied from the power source. In this case, torques delivered to the right wheel and the left wheel may differ from each other thereby reducing running stability and travelling stability of the vehicle Ve. In the following explanation, definition of the "failure of the motor" includes a failure of the inverter.

The drive force control system according to the embodiment is configured to avoid such reduction in the running stability and the travelling stability in the event of the failure of any one of the motors in the pair of motors by controlling an output torque of the other motor and a torque transmitting capacity of the clutch.

To this end, specifically, the ECU 32 executes a routine shown in FIGS. 3 to 7. The routines shown in FIGS. 3 to 7 may be implemented as a single routine, but separated into FIGS. 3 to 7 for the sake of illustration. The following explanation is given on the basis that each gear ratio between each of the motors and each of the wheels is "1" for the sake of convenience.

Figure 3:
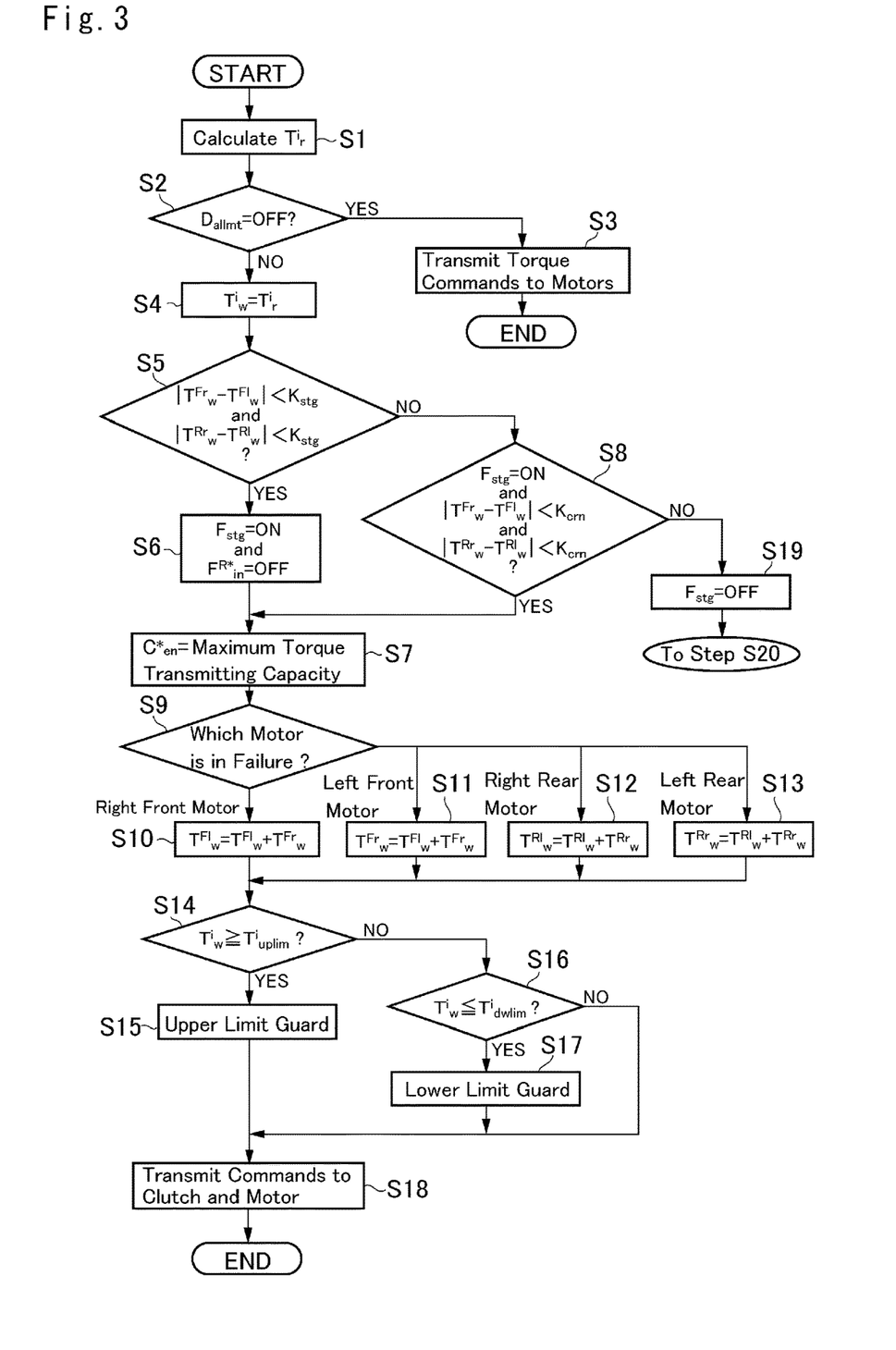
FIG. 3 is a flowchart showing step S1 to step S19 of a routine executed by the drive force control system according to the embodiment.

At step S1, required torques $T^i_r$ ($T^{Fr}_r$, $T^{Fl}_r$, $T^{Rr}_r$, $T^{Rl}_r$) of the right front wheel 1Fr, the left front wheel 1Fl, the right rear wheel 3Rr, and the left rear wheel 3Rl are calculated respectively based on a position of the accelerator pedal (i.e., an opening degree of an accelerator), an operating amount of the brake pedal (i.e., a depression of the brake pedal or a pedal force applied to the brake pedal), a steering angle, wheel speeds, a longitudinal acceleration, and so on. For example, Japanese Patent Application No. 2015-253254 describes the details of such calculation to obtain the required torques $T^i_r$ and hence detailed explanation therefore is omitted. Specifically, the required torques $T^i_r$ of a case of propelling the vehicle Ve in the forward direction will be positive values, and the required torques $T^i_r$ of a case of propelling the vehicle Ve in the reverse direction will be negative values.

Then, it is determined at step S2 whether a flag $D_{allmt}$ representing an occurrence of a failure of the motor is turned off. In other words, at step S2, it is determined whether all of the motors 4Fr, 4Fl, 4Rr, and 4Rl work properly. Such determination at step S2 may be made based on whether a difference between a torque command value transmitted from the ECU 32 and an actual value of an output torque of the motor is greater than a predetermined value. Specifically, the flag $D_{allmt}$ is turned on upon occurrence of any one of the motors. In addition, each flag Flg_$D^{Fr}$, Flg_$D^{Fl}$, Flg_$D^{Rr}$, Flg_$D^{Rl}$ representing an occurrence of a failure of each of the motors 4Fr, 4Fl, 4Rr, and 4Rl is also turned on upon occurrence of any one of the motors.

If the flag $D_{allmt}$ is turned off so that the answer of step S2 is YES, the routine progresses to step S3 to transmit torque commands to the motors 4Fr, 4Fl, 4Rr, and 4Rl based on the required torques $T^i_r$ calculated at step S1, and thereafter returns. In this case, the front clutch 25F and the rear clutch 25R are engaged or disengaged depending on the torques of the motors 4Fr, 4Fl, 4Rr, and 4Rl.

By contrast, if the flag $D_{allmt}$ is turned on so that the answer of step S2 is NO, the routine progresses to step S4 to assign each of the required torques $T^i_r$ calculated at step S1 respectively to each operator $T^i_w$ ($T^{Fr}_w$, $T^{Fl}_w$, $T^{Rr}_w$, $T^{Rl}_w$). Specifically, the required torque $T^{Fr}_r$ of the right front wheel 1Fr is assigned to the operator $T^{Fr}_w$ representing a torque of the right front wheel 1Fr, the required torque $T^{Fl}_r$ of the left front wheel 1Fl is assigned to the operator $T^{Fl}_w$ representing a torque of the left front wheel 1Fl, the required torque $T^{Rr}_r$ of the right rear wheel 3Rr is assigned to the operator $T^{Rr}_w$ representing a torque of the right rear wheel 3Rr, and the required torque $T^{Rl}_r$ of the left rear wheel 3Rl is assigned to the operator $T^{Rl}_w$ representing a torque of the left rear wheel 3Rl. Consequently, the torques of the wheels 1Fr, 1Fl, 3Rr, and 3Rl are respectively changed based on the required torques $T^i_r$. In the following explanation, the operators $T^{Fr}_w$, $T^{Fl}_w$, $T^{Rr}_w$, $T^{Rl}_w$ will also be called the required torques $T^{Fr}_r$, $T^{Fl}_r$, $T^{Rr}_r$, $T^{Rl}_r$.

Then, it is determined at Step S5 whether a difference between the required torque of the right wheel and the required torque of the left wheel is smaller than a first predetermined value $K_{stg}$. Specifically, it is determined whether an absolute value of a difference between the required torque $T^{Fr}_w$ of the right front wheel 1Fr and the required torque $T^{Fl}_w$ of the left front wheel 1Fl ($T^{Fr}_w - T^{Fl}_w$) is smaller than the first predetermined value $K_{stg}$, and whether an absolute value of a difference between the required torque $T^{Rr}_w$ of the right rear wheel 3Rr and the required torque $T^{Rl}_w$ of the left rear wheel 3Rl ($T^{Rr}_w - T^{Rl}_w$) is smaller than the first predetermined value $K_{stg}$. To this end, the first predetermined value $K_{stg}$ is set to a value possible to determine that the required torque of the right wheel and the required torque of the left wheel are equal to each other, and stored in the ECU 32.

If the difference between the required torque of the right wheel and the required torque of the left wheel is smaller than the first predetermined value $K_{stg}$ so that the answer of step S5 is YES, the routine progresses to step S6 to turn on a straight running flag $F_{stg}$ representing a straight running of the vehicle Ve, and to turn off an execution flag $F^{R*}_{in}$ to execute a below-mentioned inner wheel control. Then, at step S7, required torque transmitting capacities $C^*_{en}$ of the front clutch 25F and the rear clutch 25R are increased to the maximum values. Specifically, a required torque transmitting capacity $C^F_{en}$ of the front clutch 25F, and a required torque transmitting capacity $C^R_{en}$ of the rear clutch 25R are respectively increased to the maximum values. In other words, the front clutch 25F, is engaged completely to distribute the torque equally to the right front wheel 1Fr and to the left front wheel 1Fl, and the rear clutch 25R is engaged completely to distribute the torque equally to the right rear wheel 3Rr and to the left rear wheel 3Rl.

By contrast, if the difference between the required torque of the right wheel and the required torque of the left wheel is greater than the first predetermined value $K_{stg}$ so that the answer of step S5 is NO, the routine progresses to step S8. At step S8, it is determined whether the straight running flag $F_{stg}$ is on, whether the absolute value of the difference between the required torque $T^{Fr}_w$ of the right front wheel 1Fr and the required torque $T^{Fl}_w$ of the left front wheel 1Fl ($T^{Fr}_w - T^{Fl}_w$) is smaller than a second predetermined value $K_{crn}$, and whether the absolute value of the difference between the required torque $T^{Rr}_w$ of the right rear wheel 3Rr and the required torque $T^{Rl}_w$ of the left rear wheel 3Rl ($T^{Rr}_w - T^{Rl}_w$) is smaller than the second predetermined value $K_{crn}$. Such determinations at step S8 are made to determine whether the vehicle Ve still travels in a straight line even if a difference between the required torque of the right wheel and the required torque of the left wheel is induced e.g., by a slight operation of a steering wheel during straight running. In other words, such determinations at step S8 are made to determine whether to keep the straight running flag $F_{stg}$ on. To this end, the second predetermined value $K_{crn}$ is set to a value greater than the first predetermined value $K_{stg}$. That is, a hysteresis is set between a threshold for determining a straight running and a below-mentioned threshold for determining a turning.

If the straight running flag $F_{stg}$ is on, the absolute value of the difference between the required torques of the right front wheel 1Fr and the left front wheel 1Fl ($T^{Fr}_w - T^{Fl}_w$) is smaller than the second predetermined value $K_{crn}$, and the absolute value of the difference between the required torques of the right rear wheel 3Rr and the left rear wheel 3Rl ($T^{Rr}_w - T^{Rl}_w$) is smaller than the second predetermined value $K_{crn}$ so that the answer of step S8 is YES, the routine progresses to step S7 to engage the front clutch 25F and the rear clutch 25R completely.

Subsequent to step S7, the routine progresses to step S9 to specify the motor that cannot generate a required torque due to failure based on the flag Flg_$D^{Fr}$, Flg_$D^{Fl}$, Flg_$D^{Rr}$, Flg_$D^{Rl}$. In the routine shown in FIG. 3, although the faulty motor is specified by the single step, it is also possible to specify the faulty motor by a plurality of steps.

In a case that the failure occurs in the right front motor 4Fr, the routine progresses to step S10 to update the operator $T^{Fl}_w$ representing the torque of the left front wheel 1Fl to a value obtained by adding the operator $T^{Fr}_w$ to the operator $T^{Fl}_w$ set respectively at step S4.

In a case that the failure occurs in the left front motor 4Fl, the routine progresses to step S11 to update the operator $T^{Fr}_w$ representing the torque of the right front wheel 1Fr to a value obtained by adding the operator $T^{Fr}_w$ to the operator $T^{Fl}_w$ set respectively at step S4.

In a case that the failure occurs in the right rear motor 4Rr, the routine progresses to step S12 to update the operator $T^{Rl}_w$ representing the torque of the left rear wheel 3Rl to a value obtained by adding the operator $T^{Rr}_w$ to the operator $T^{Rl}_w$ set respectively at step S4.

In a case that the failure occurs in the left rear motor 4Rl, the routine progresses to step S13 to update the operator $T^{Rr}_w$ representing the torque of the right rear wheel 3Rr to a value obtained by adding the operator $T^{Rr}_w$ to the operator $T^{Rl}_w$ set respectively at step S4.

Thus, at steps S10 to S13, the required torque of the wheel coupled to the motor paired with the faulty motor is increased in the amount of the required torque of the wheel coupled to the faulty motor.

Then, the routine progresses to step S14 to determine whether the updated operator $T^i_w$ is equal to or greater than an upper limit torque $T^i_{uplim}$ of the motor paired with the faulty motor. That is, at step S14, it is determined whether it is possible to generate the torque based on the updated operator $T^i_w$ by the motor paired with the faulty motor. Specifically, each of the upper limit torques $T^i_{uplim}$ is respectively set to a maximum output torque of each of the motors. Since the output torque of the motor is changed depending on a vehicle speed, at step S14, the upper limit torque $T^i_{uplim}$ may be changed depending on a vehicle speed.

If the updated operator $T^i_w$ is equal to or greater than the upper limit torque $T^i_{uplim}$ of the motor paired with the faulty motor so that the answer of step S14 is YES, the routine progresses to step S15 to further update the updated operator $T^i_w$ to the upper limit torque $T^i_{uplim}$ of the motor paired with the faulty motor (i.e., an upper limit guard). For example, in the event of failure of the left front motor 4Fl, if the upper limit torque $T^{Fr}_{uplim}$ of the right front motor 4Fr is 100 Nm and the updated operator $T^{Fr}_w$ is 110 Nm, the updated operator $T^{Fr}_w$ is further updated to 100 Nm.

By contrast, if the updated operator $T^i_w$ is smaller than the upper limit torque $T^i_{uplim}$ of the motor paired with the faulty motor so that the answer of step S14 is NO, the routine progresses to step S16 to determine whether the updated operator $T^i_w$ is equal to or smaller than a lower limit torque $T^i_{dwlim}$. Specifically, each of the lower limit torques $T^i_{dwlim}$ is respectively set to a maximum brake torque of each of the motors. Since the brake torque of the motor is also changed depending on a vehicle speed, at step S16, the lower limit torque $T^i_{dwlim}$ may be changed depending on a vehicle speed.

If the updated operator $T^i_w$ is equal to or smaller than a lower limit torque $T^i_{dwlim}$ so that the answer of step S16 is YES, the routine progresses to step S17 to further update the updated operator $T^i_w$ to the lower limit torque $T^i_{dwlim}$ of the motor paired with the faulty motor (i.e., a lower limit guard). Thus, the upper limit torque or the lower limit torque of the motor paired with the faulty motor is set from step S14 to step S17.

Subsequent to steps S15 and S17, or if the updated operator $T^i_w$ is greater than a lower limit torque $T^i_{dwlim}$ so that the answer of step S16 is NO, the routine progresses to step S18 to transmit command signals to the motor and the clutch. For example, in the event of failure of the left front motor 4Fl, a torque command signal based on the operator $T^i_w$ updated at step S11, S15, or S16 is transmitted to the right front motor 4Fr, and a command signal to engage the front clutch 25F set at step S7 is transmitted to the front clutch 25F. In this situation, the rear clutch 25R may be not only engaged but also disengaged.

Consequently, the right front motor 4Fr generates the required torque $T^{Fl}_w$ the left front wheel 1Fl in addition to the required torque $T^{Fr}_w$ of the right front wheel 1Fr so that a part of the output torque of the right front motor 4Fr (i.e., the required torque $T^{Fl}_w$) is delivered to the left front wheel 1Fl through the front clutch 25F. Thereafter, the routine returns. According to the embodiment, the front clutch 25F and the rear clutch 25R are individually adapted to be disengaged by stopping current supply thereto. At step S18, therefore, current supply to the front clutch 25F or the rear clutch 25R is stopped.

Otherwise, if the straight running flag $F_{stg}$ is off, the absolute value of the difference between the required torques of the right front wheel 1Fr and the left front wheel 1Fl ($T^{Fr}_w - T^{Fl}_w$) is greater than the second predetermined value $K_{crn}$, or the absolute value of the difference between the required torques of the right rear wheel 3Rr and the left rear wheel 3Rl ($T^{Rr}_w - T^{Rl}_w$) is smaller than the second predetermined value $K_{cm}$ so that the answer of step S8 is NO, the routine progresses to step S19 to maintain the straight running flag $F_{stg}$ to be off, or to turn off the straight running flag $F_{stg}$. That is, if the difference between the required torques of the right wheel and the left wheel is relatively large, a turning of the vehicle Ve is determined. Such determination of turning of the vehicle Ve is also made in a case that the difference between the required torques of the right wheel and the left wheel is relatively large due to increase in a slip rate of one of the wheels, even during straight propulsion.

Figure 4:
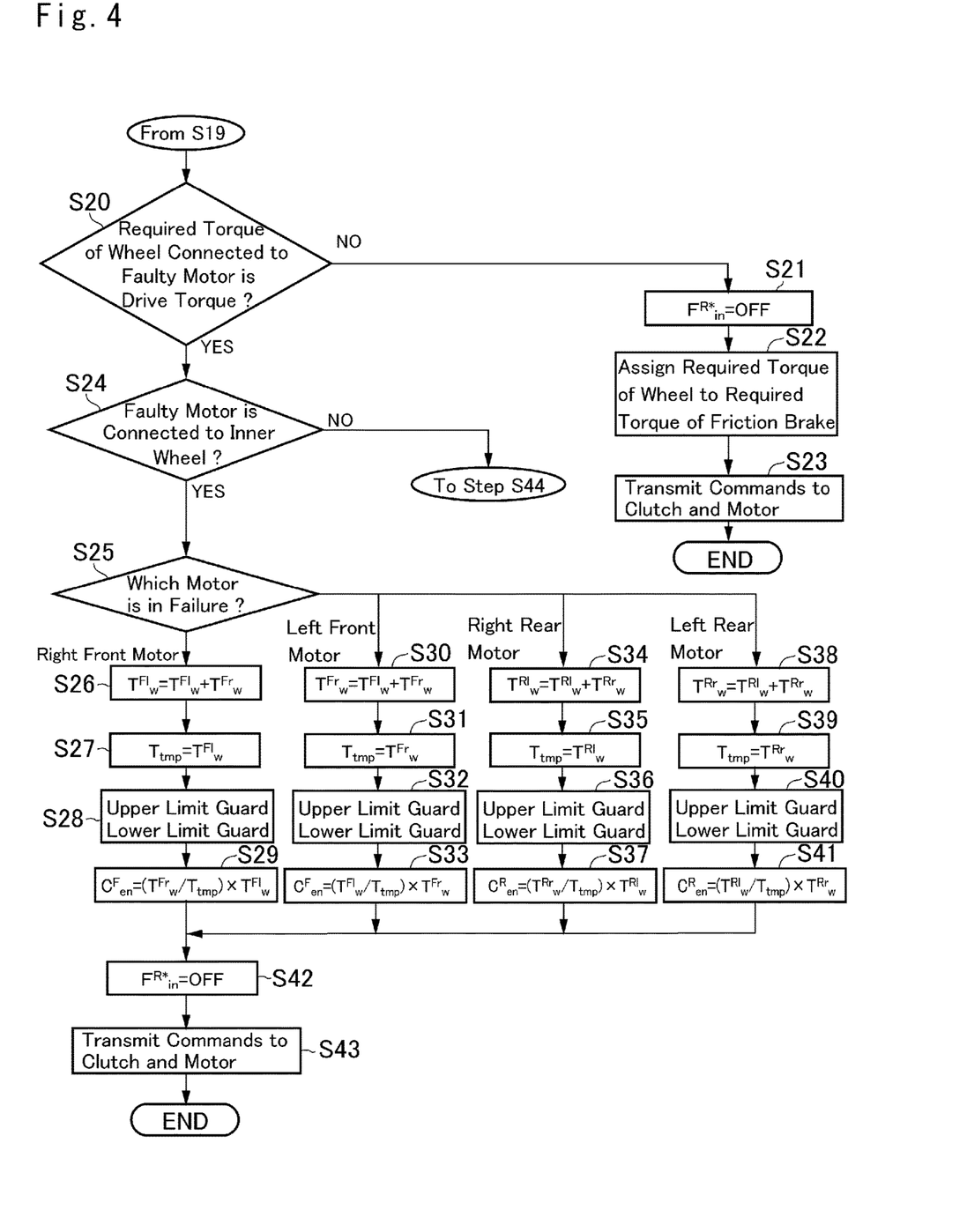
FIG. 4 is a flowchart showing step S20 to step S43 of the routine executed by the drive force control system according to the embodiment.

Then, the routine progresses to step S20 to determine whether the required torque of the wheel coupled to the faulty motor is a drive torque. At step S20, specifically, it is determined whether the operator $T^i_w$ set at step S4 based on the required torque $T^i_r$ of the wheel coupled to the faulty motor is a positive value. In the front drive unit 2F or the rear drive unit 2R, a brake torque can be generated by the friction brake 17Fr, 17Fl, 17Rr, or 17Rl even when the motor cannot generate a brake torque. Therefore, if the required torque of the wheel coupled to the faulty motor is a brake torque, the friction brake connected to the above-mentioned wheel generates a brake torque.

If the required torque of the wheel coupled to the faulty motor is a brake torque so that the answer of step S20 is NO, the routine progresses to step S21 to turn off the execution flag $F^{R*}_{in}$ of the inner wheel control. Then, at step S22, the required torque of the wheel coupled to the faulty motor is assigned to a required torque of the friction brake connected to the wheel coupled to the faulty motor. For example, in the event of failure of the left front motor 4Fl, the operator $T^{Fl}_w$ representing a torque of the left front wheel 1Fl is assigned to a required torque $B^{Fl}$ of the left front friction brake 17Fl.

Thereafter, at step S23, command signals are transmitted to the motor and the clutch, and the routine returns. At step S23, specifically, a torque command signal set at step S22 based on the required torque is transmitted to the friction brake connected to the faulty motor, and a torque command signal based on the operator set at step S4 is transmitted to the motor paired with the faulty motor. In this situation, the front clutch 25F or the rear clutch 25R are engaged or disengaged depending on a torque difference between the right wheel and the left wheel.

For example, in the event of failure of the left front motor 4Fl, a torque command signal based on the operator $T^{Fl}_w$ is transmitted to the right front motor 4Fr, a torque command signal based on the operator $T^{Rr}_w$ is transmitted to the right rear motor 4Rr, a torque command signal based on the operator $T^{Rl}_w$ is transmitted to the left rear motor 4Rl, and a torque command signal set at step S22 based on the required torque $B^{Fl}$ is transmitted to the left front brake coil 16Fl of the left front friction brake 17Fl.

By contrast, if the required torque of the wheel coupled to the faulty motor is a drive torque so that the answer of step S20 is YES, the routine progresses to step S24 to determine whether the faulty motor is coupled to the inner wheel. At step S24, specifically, it is determined whether the required torque of the wheel coupled to the faulty motor is smaller than the required torque of the wheel paired with the wheel coupled to the faulty motor.

If the faulty motor is coupled to the inner wheel so that the answer of step S24 is YES, the routine progresses to step S25 to specify the faulty motor. Specifically, step S24 may be executed by the same procedure as the aforementioned step S9.

In a case that the failure occurs in the right front motor 4Fr, the routine progresses to step S26 to update the operator $T^{Fl}_w$ representing the torque of the left front wheel 1Fl to a value obtained by adding the operator $T^{Fr}_w$ to the operator $T^{Fl}_w$ set respectively at step S4. That is, the required torque of the wheel paired with the wheel coupled to the faulty motor is increased in the amount of the required torque of the wheel coupled to the faulty motor.

Then, the operator $T^{Fl}_w$ (i.e., the required torque) updated at step S26 is stored temporarily as a temporal operator $T_{tmp}$ at step S27, and the temporal operator $T_{tmp}$ is guarded by the upper limit torque and the lower limit torque at step S28 by the same procedures as the aforementioned steps S14 to S17.

Thereafter, at step S29, a torque transmitting capacity $C^F_{en}$ of the front clutch 25F is calculated by dividing the operator $T^{Fr}_w$ by the temporal operator $T_{tmp}$ stored at step S27 or by the operator $T^{Fr}_w$ guarded at step S28, and multiplying the divided operator $T^{Fr}_w$ by the operator $T^{Fl}_w$. That is, the torque transmitting capacity $C^F_{en}$ of the front clutch 25F is calculated by multiplying a current torque ratio between the right wheel and the left wheel by the required torque of the wheel paired with the wheel coupled to the faulty motor. In a case of generating torque only by the left front motor 4Fl without generating torque by the right front motor 4Fr, therefore, the required torque of the right front wheel 1Fr can be delivered from the left front motor 4Fl to the right front wheel 1Fr through the front clutch 25F, while preventing excessive torque delivery to the left front wheel 1Fl.

In a case that the failure occurs in the left front motor 4Fl, the right rear motor 4Rr, or the left rear motor 4Rl, the required torque of the wheel paired with the wheel coupled to the faulty motor, and a torque transmitting capacity $C^F_{en}$ of the front clutch 25F or a torque transmitting capacity $C^R_{en}$ of the rear clutch 25R, are calculated by the same procedures as the aforementioned steps S26 to S29. Therefore, detailed explanations for steps S30 to S41 will be omitted.

Subsequent to step S29, S33, S37, or S41, the routine progresses to step S42 to turn off the execution flag $F^{R*}_{in}$ of the inner wheel control. Thereafter, at step S43, the command signals are transmitted to the motor and the clutch, and the routine returns. At step S43, specifically, a torque command signal set at step S26, S30, S34, or S38 based on the required torque of the wheel paired with the wheel coupled to the faulty motor is transmitted to the motor coupled to the wheel paired with the wheel coupled to the faulty motor, and a torque command signal based on the operator set at step S4 is transmitted to the motor paired with the faulty motor. In addition, a command signal based on the torque transmitting capacity calculated at step S29, S33, S37, or S41 is transmitted to the front clutch 25F or the rear clutch 25R. In this situation, in the other drive unit in which both motors work properly, the front clutch 25F or the rear clutch 25R are engaged or disengaged depending on a torque difference between the right motor and the left motor.

Figure 5:
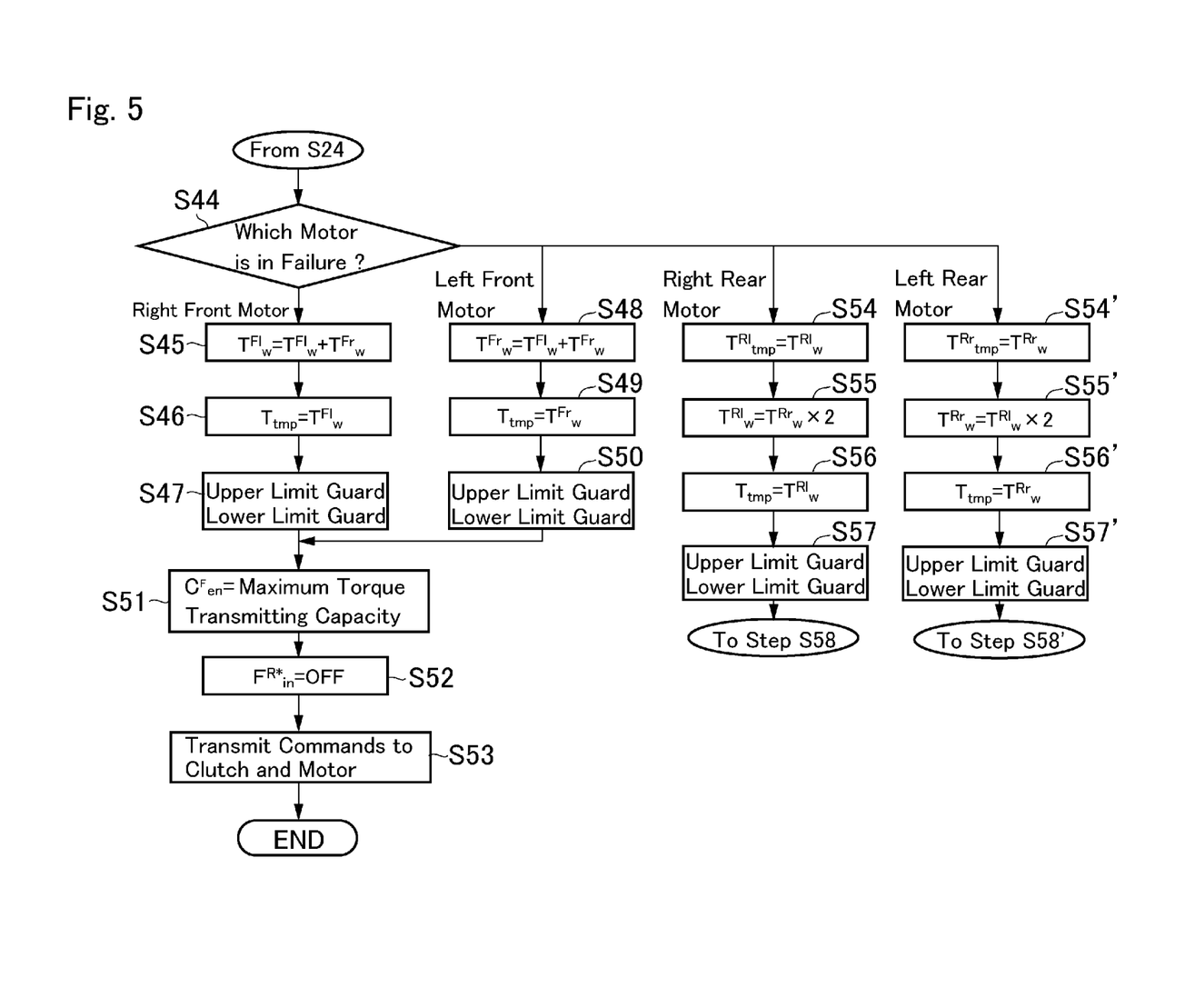
FIG. 5 is a flowchart showing step S44 to step S57 (S57') of the routine executed by the drive force control system according to the embodiment.

Otherwise, if the faulty motor is coupled to the outer wheel so that the answer of step S24 is NO, the routine progresses to step S44 to specify the faulty motor. Specifically, step S44 may also be executed by the same procedure as the aforementioned steps S9 and S25.

In a case that the failure occurs in the right front motor 4Fr, the routine progresses to step S45 to update the operator $T^{Fl}_w$ representing the torque of the left front wheel 1Fl by the same procedure as step S26. Then, the operator $T^{Fl}_w$ updated at step S45 is stored temporarily as a temporal operator $T_{tmp}$ at step S46, and the temporal operator $T_{tmp}$ is guarded by the upper limit torque and the lower limit torque at step S47 by the same procedure as the aforementioned step S28.

Likewise, in a case that the failure occurs in the left front motor 4Fl, the routine progresses sequentially from step S48 to S50 to execute the same controls as the aforementioned steps from S30 to S32.

In a case that the failure occurs in any of the front motors 4Fr and 4Fl, the routine progresses to step S51 to increase a torque transmitting capacity of the front clutch 25F to the maximum value as the aforementioned step S7. In those cases, a tuning performance of the vehicle Ve is enhanced more effectively by rotating a steering wheel to turn the front wheels rather than differentiating the torques of the right wheel and the left wheel. In those cases, therefore, the vehicle is turned by rotating the steering wheel while engaging the front clutch 25F completely, without differentiating the torques of the right wheel and the left wheel.

Subsequent to step S51, the routine progresses to step S52 to turn off the execution flag $F^{R*}_{in}$ of the inner wheel control. Thereafter, at step S53, the command signals are transmitted to the motor and the clutch, and the routine returns. At step S53, specifically, a torque command signal set at step S47 or S50 based on the required torque of the motor paired with the faulty motor is transmitted to the motor paired with the faulty motor, and a torque command signal based on the operators set at step S4 are transmitted to the other motors (except for the faulty motor). In addition, a command signal based on the torque transmitting capacity calculated at step S51 is transmitted to the front clutch 25F, and a command signal to reduce the torque transmitting capacity to zero is transmitted to the rear clutch 25R. If the operator $T^{Rr}_{w}$ representing a torque of the right rear wheel 3Rr, and the operator $T^{Rl}_{w}$ representing a torque of the left rear wheel 3Rl are identical to each other, the rear clutch 25R may be engaged.

Otherwise, in a case that the failure occurs in any of the right rear motor 4Rr and the left rear motor 4Rl, a pulse control and an intermittent control are executed cooperatively. Specifically, the pulse control is executed to generate a high torque and a low torque alternately by the motor paired with the faulty motor. Meanwhile, the intermittent control is executed to engage the rear clutch 25R when the motor paired with the faulty motor generates the high torque (that is, to increase a torque transmitting capacity) and to disengage the rear clutch 25R when the motor paired with the faulty motor generates the low torque (that is, to reduce a torque transmitting capacity). According to the embodiment, the inner wheel control includes the pulse control and the intermittent control.

Figure 6:
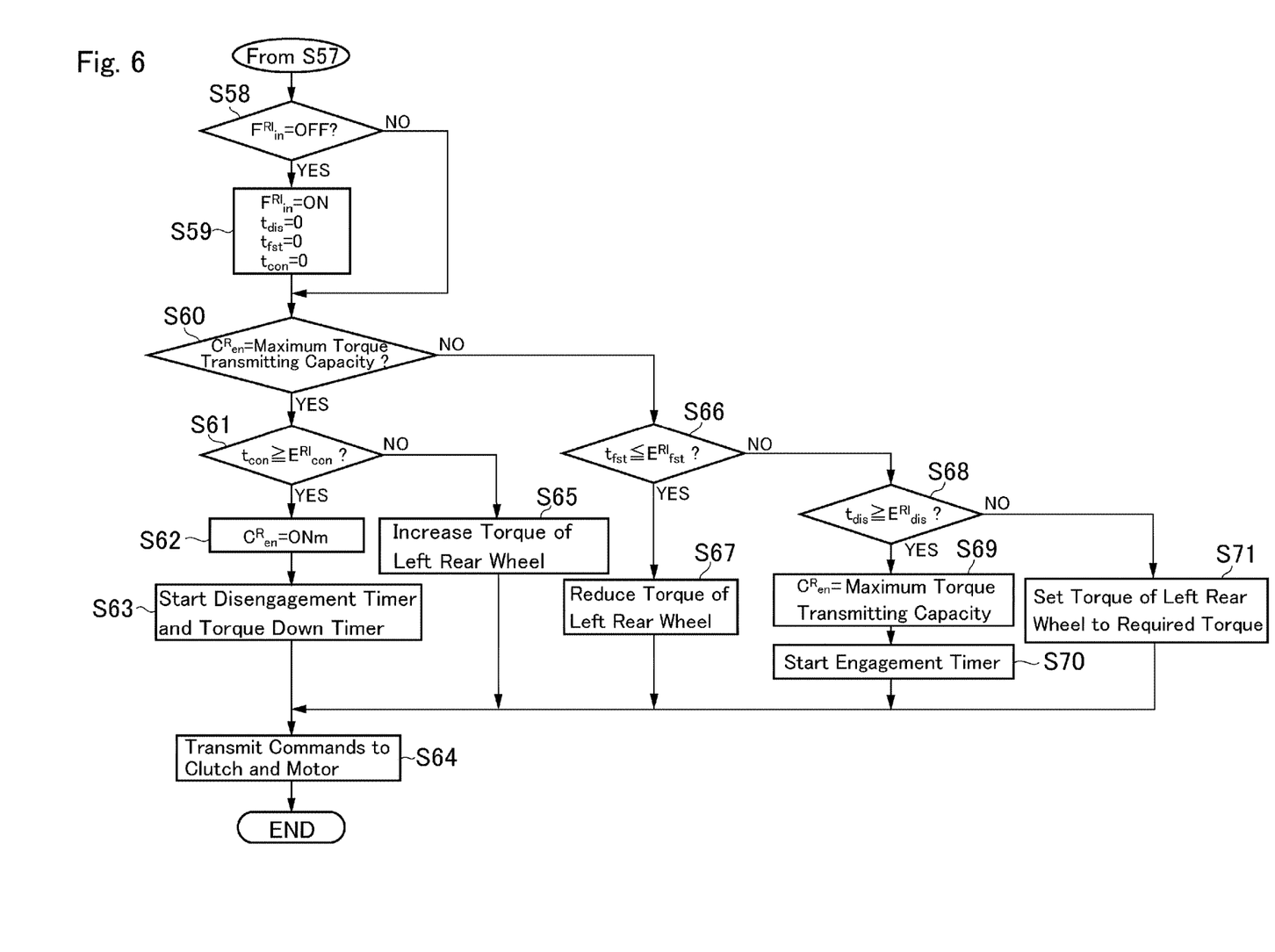
FIG. 6 is a flowchart showing step S58 to step S71 of the routine executed by the drive force control system according to the embodiment.
Figure 7:
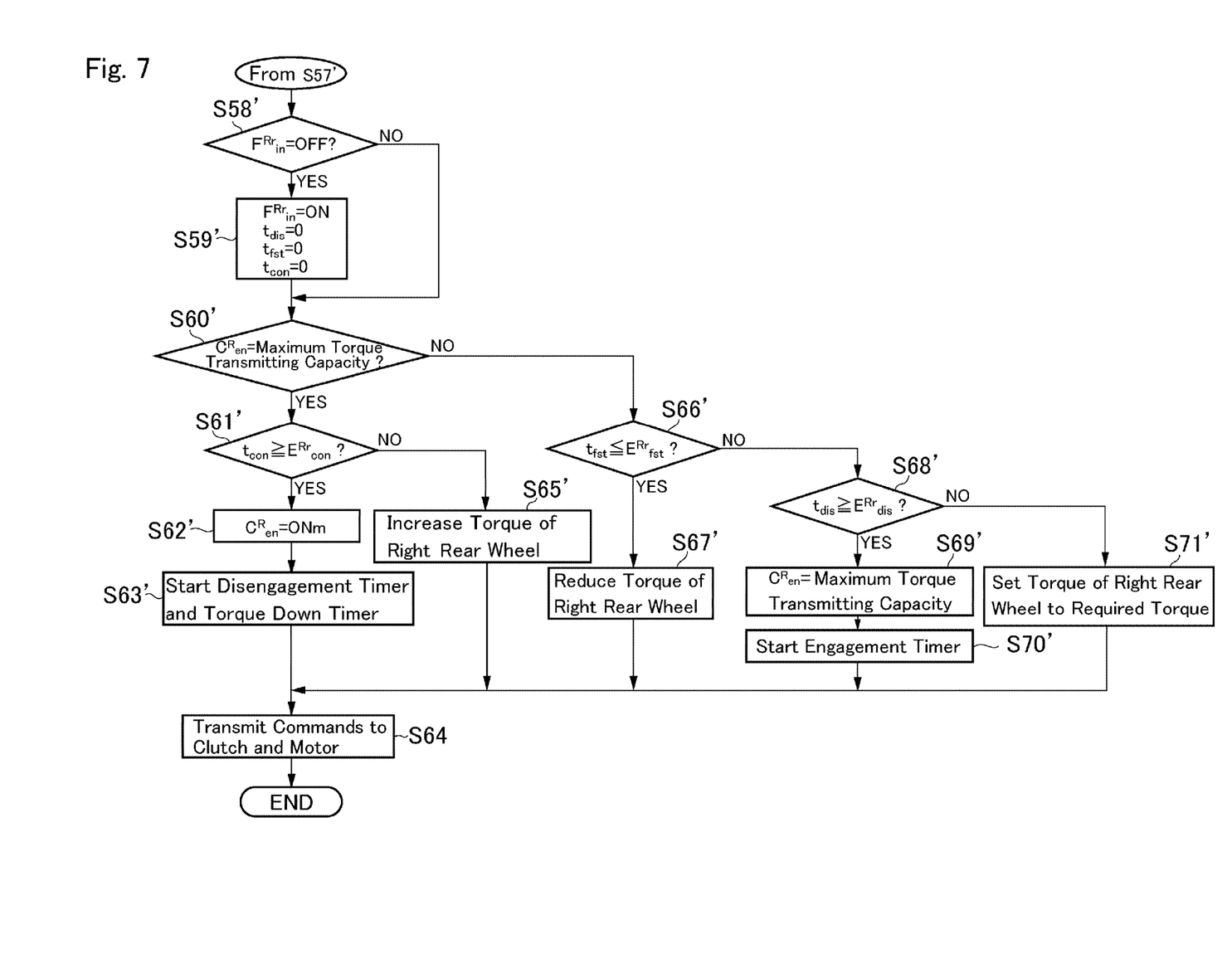
FIG. 7 is a flowchart showing step S58' to step S71' of the routine executed by the drive force control system according to the embodiment.

In the cases that the failure occurs in any of the right rear motor 4Rr and the left rear motor 4Rl, although different operators will be updated, substantially same controls will be executed. Therefore, only the control to be executed in the event of failure of the right rear motor 4Rr will be explained hereinafter with reference to FIGS. 5 and 6. The control to be executed in the event of failure of the left rear motor 4Rl is shown in FIGS. 5 and 7, and an apostrophe is provided respectively to steps to be executed in the event of failure of the left rear motor 4Rl.

In the case that the failure occurs in the right rear motor 4Rr, the routine progresses to step S54 to store the operator $T^{Rl}_{w}$ as a temporal operator $T^{Rl}_{tmp}$, and then, the operator $T^{Rl}_{w}$ is updated at step S55 to a value obtained by multiplying the operator $T^{Rr}_{w}$ by a predetermined times (e.g., two times). During execution of the inner wheel control, the rear clutch 25R is engaged temporarily to deliver an output torque of the motor paired with the faulty motor to the wheel coupled to the faulty motor 4. Since the operator $T^{Rl}_{w}$ is updated at step S55 to the value twice as much as the operator $T^{Rr}_{w}$, when the output torque of the motor working properly is distributed equally to the right wheel and the left wheel, a required torque can be delivered to the outer wheel requiring a larger torque. At step S55, the operator $T^{Rl}_{w}$ may also be updated to a value other than the value twice as much as the operator $T^{Rr}_{w}$. That is, the operator $T^{Rl}_{w}$ may also be updated to a value greater than the operator $T^{Rr}_{w}$ taking account of running stability in the event of failure of the motor.

Then, the operator $T^{Rl}_{w}$ updated at step S55 is stored temporarily as a temporal operator $T_{tmp}$ at step S56, and the temporal operator $T_{tmp}$ is guarded by the upper limit torque and the lower limit torque at step S57 by the same procedure as the aforementioned step S28.

Subsequent to step S57, the routine progresses to step S58 to determine whether an execution flag $F^{Rl}_{in}$ to execute a left inner wheel control is turned off. The execution flag $F^{Rl}_{in}$ is turned on by executing the below-mentioned step S59, and turned off by executing the aforementioned steps S6, S21, S42, or S52. Specifically, the execution flag $F^{Rl}_{in}$ is turned on in a case that step S59 has been executed in the previous routine, and steps S6, S21, S42, or S52 has not yet been executed. By contrast, the execution flag $F^{Rl}_{in}$ is turned off in a case that steps S6, S21, S42, or S52 has been executed, or right after an occurrence of failure in the motor.

If the execution flag $F^{Rl}_{in}$ to execute the left inner wheel control is off so that the answer of step S58 is YES, the routine progresses to step S59 to start the left inner wheel control. At step S59, specifically, the execution flag $F^{Rl}_{in}$ is turned on, a count value of a disengagement timer $t_{dis}$ measuring an elapsed time from a point at which the rear clutch 25R is disengaged is reset to zero, a count value of a torque down timer $t_{fst}$ measuring an elapsed time from a point at which the torque of the left rear motor 4Rl is reduced is reset to zero, and a count value of an engagement timer $t_{con}$ measuring an elapsed time from a point at which the rear clutch 25R is engaged is reset to zero. By contrast, if the execution flag $F^{Rl}_{in}$ to execute the left inner wheel control is on so that the answer of step S58 is NO, the routine skips step S58.

Then, it is determined at step S60 whether the command signal to engage the rear clutch 25R has been transmitted. If the command signal to engage the rear clutch 25R has been transmitted so that the answer of step S60 is YES, the routine progresses to step S61 to determine whether the count value of the engagement timer $t_{con}$ is equal to or greater than a first predetermined time period $E^{Rl}_{con}$. Specifically, the first predetermined time period $E^{Rl}_{con}$ is set to a value possible to deliver the torque of the left rear motor 4Rl sufficiently to the right rear wheel 3Rr based on an experimental result. The first predetermined time period $E^{Rl}_{con}$ may be changed depending on a magnitude of the output torque of the left rear motor 4Rl and an external condition such as an external temperature.

If the count value of the engagement timer $t_{con}$ is equal to or greater than the first predetermined time period $E^{Rl}_{con}$ so that the answer of step S61 is YES, the routine progresses to step S62 to set a torque transmitting capacity of the rear clutch 25R to zero, and further progresses to step S63 to start the disengagement timer $t_{dis}$ and the torque down timer $t_{fst}$. Thereafter, at step S64, the command signals are transmitted to the motor and the clutch, and the routine returns. At step S64, specifically, a torque command signal based on the operator $T^{Fr}_{w}$ set at step S4 is transmitted to the right front motor 4Fr, a torque command signal based on the operator $T^{Fl}{}_w$ set at step S4 is transmitted to the left front motor 4Fl, a torque command signal to generate the currently generated torque is transmitted to the left rear motor 4Rl, and a command signal to reduce the torque transmitting capacity to zero is transmitted to the rear clutch 25R. In this case, if the operator $T^{Fr}{}_w$ representing a torque of the right front wheel 1Fr and the operator $T^{Fl}{}_w$ representing a torque of the left front wheel 1Fl are identical to each other, a command signal to engage completely is transmitted to the front clutch 25F. By contrast, if the operator $T^{Fr}{}_w$ and the operator $T^{Fl}{}_w$ are different from each other, a command signal to disengage completely (that is, to reduce a torque transmitting capacity to zero) is transmitted to the front clutch 25F.

Otherwise, if the count value of the engagement timer $t_{con}$ is smaller than the first predetermined time period $E^{Rl}{}_{con}$ so that the answer of step S61 is NO, the routine progresses to step S65 to increase the torque of the left rear wheel Rl. Specifically, the operator $T^{Rl}{}_w$ is set to the maximum output torque $T_{tmp}$.

Thereafter, at step S64, the command signals are transmitted to the motor and the clutch, and the routine returns. In this case, at step S64, the torque command signal based on the operator $T^{Fr}{}_w$ set at step S4 is also transmitted to the right front motor 4Fr, the torque command signal based on the operator $T^{Fl}{}_w$ set at step S4 is also transmitted to the left front motor 4Fl, a torque command signal set at step S65 is transmitted to the left rear motor 4Rl, and a command signal to engage completely is transmitted to the rear clutch 25R. In this case, if the operator $T^{Fr}{}_w$ representing a torque of the right front wheel 1Fr and the operator $T^{Fl}{}_w$ representing a torque of the left front wheel 1Fl are identical to each other, a command signal to engage completely is transmitted to the front clutch 25F. By contrast, if the operator $T^{Fr}{}_w$ and the operator $T^{Fl}{}_w$ are different from each other, a command signal to disengage completely (that is, to reduce a torque transmitting capacity to zero) is transmitted to the front clutch 25F.

If the command signal to engage the rear clutch 25R has not been transmitted so that the answer of step S60 is NO, the routine progresses to step S66 to determine whether the count value of the torque down timer $t_{fst}$ is equal to or smaller than a second predetermined time period $E^{Rl}{}_{fst}$. Specifically, the second predetermined time period $E^{Rl}{}_{fst}$ is set to a value required to change a total torque of an inertia torque of the left rear wheel 3Rl and the torque transmitted from the left rear motor 4Rl to the actual required torque of the left rear wheel 3Rl calculated at step S1, based on an experimental result. The second predetermined time period $E^{Rl}{}_{fst}$ may be changed depending on a value of the operator $T^{Rl}{}_w$ updated at step S55.

If the count value of the torque down timer $t_{fst}$ is equal to or smaller than the second predetermined time period $E^{Rl}{}_{fst}$, that is, if the rear clutch 25R has just been disengaged so that the answer of step S66 is YES, the routine progresses to step S67 to set a value of the operator $T^{Rl}{}_w$ to a low torque. At step S67, specifically, the operator $T^{Rl}{}_w$ is set to a value smaller than the temporal operator $T^{Rl}{}_{tmp}$ stored at step S54. In other words, the operator $T^{Rl}{}_w$ is set to a value smaller than the required torque of the left rear wheel 3Rl. Consequently, the total torque of the inertia torque of the left rear wheel 3Rl and the torque transmitted from the left rear motor 4Rl can be changed to the actual required torque of the left rear wheel 3Rl. A reduction amount of the torque at step S58 may be determined based on an experimental result. The reduction amount of the torque at step S58 may be changed depending on a magnitude of the inertia torque of the left rear wheel 3Rl. Instead, the reduction amount of the torque at step S58 may also be set as a negative torque applied to the left rear wheel 3Rl as a brake torque. According to the embodiment, a magnitude of the torque is based on a magnitude of the torque to increase a rotational speed of the wheel. That is, even if an absolute value of the drive torque is smaller than an absolute value of the brake torque, the drive torque is higher than the brake torque.

Thereafter, at step S64, the command signals are transmitted to the motor and the clutch, and the routine returns. In this case, at step S64, the torque command signal based on the operator $T^{Fr}{}_w$ set at step S4 is also transmitted to the right front motor 4Fr, the torque command signal based on the operator $T^{Fl}{}_w$ set at step S4 is also transmitted to the left front motor 4Fl, a torque command signal set at step S67 is transmitted to the left rear motor 4Rl, and a command signal to disengage completely is transmitted to the rear clutch 25R. In this case, if the operator $T^{Fr}{}_w$ representing a torque of the right front wheel 1Fr and the operator $T^{Fl}{}_w$ representing a torque of the left front wheel 1Fl are identical to each other, the command signal to engage completely is transmitted to the front clutch 25F. By contrast, if the operator $T^{Fr}{}_w$ and the operator $T^{Fl}{}_w$ are different from each other, the command signal to disengage completely (that is, to reduce a torque transmitting capacity to zero) is transmitted to the front clutch 25F.

If the count value of the torque down timer $t_{fst}$ is greater than the second predetermined time period $E^{Rl}{}_{fst}$ so that the answer of step S66 is NO, the routine progresses to step S68 to determine whether the count value of the disengagement timer $t_{dis}$ is equal to or greater than a third predetermined time period $E^{Rl}{}_{dis}$. The third predetermined time period $E^{Rl}{}_{dis}$ is set longer than the second predetermined time period $E^{Rl}{}_{fst}$. Specifically, the third predetermined time period $E^{Rl}{}_{dis}$ is set to a value that the torque of the right rear wheel 3Rr will not be reduced excessively by a road load such as a friction between the right rear wheel 3Rr and a road surface, based on an experimental result. The second predetermined time period $E^{Rl}{}_{fst}$ may be changed depending, e.g., on a vehicle speed.

If the count value of the disengagement timer $t_{dis}$ is equal to or greater than the third predetermined time period $E^{Rl}{}_{dis}$ so that the answer of step S68 is YES, the routine progresses to step S69 to set the torque transmitting capacity $C^R{}_{en}$ of the rear clutch 25R to the maximum value thereby engaging the rear clutch 25R completely, and further progresses to step S70 to start the engagement timer $t_{con}$.

Thereafter, at step S64, the command signals are transmitted to the motor and the clutch, and the routine returns. In this case, at step S64, the torque command signal based on the operator $T^{Fr}{}_w$ set at step S4 is also transmitted to the right front motor 4Fr, the torque command signal based on the operator $T^{Fl}{}_w$ set at step S4 is also transmitted to the left front motor 4Fl, a torque command signal set based on the operator $T^{Rl}{}_w$ updated at step S55 is transmitted to the left rear motor 4Rl, and a command signal based on the torque transmitting capacity $C^R{}_{en}$ set at step S69 is transmitted to the rear clutch 25R. In this case, if the operator $T^{Fr}{}_w$ representing a torque of the right front wheel 1Fr and the operator $T^{Fl}{}_w$ representing a torque of the left front wheel 1Fl are identical to each other, the command signal to engage completely is transmitted to the front clutch 25F. By contrast, if the operator $T^{Fr}{}_w$ and the operator $T^{Fl}{}_w$ are different from each other, the command signal to disengage completely (that is, to reduce a torque transmitting capacity to zero) is transmitted to the front clutch 25F.

By contrast, if the count value of the disengagement timer $t_{dis}$ is smaller than the third predetermined time period $E^{Rl}{}_{dis}$ so that the answer of step S68 is NO, the routine progresses to step S69 to set the operator $T^{Rl}_w$ to the required torque of the left rear wheel 3Rl. Specifically, the temporal operator $T^{Rl}_{tmp}$ stored at step S54 is assigned to the operator $T^{Rl}_w$.

Thereafter, at step S64, the command signals are transmitted to the motor and the clutch, and the routine returns. In this case, at step S64, the torque command signal based on the operator $T^{Fr}_w$ set at step S4 is also transmitted to the right front motor 4Fr, the torque command signal based on the operator $T^{Fl}_w$ set at step S4 is also transmitted to the left front motor 4Fl, a torque command signal set based on the temporal operator $T^{Rl}_{tmp}$ stored at step S54 is transmitted to the left rear motor 4Rl, and a command to disengage completely is transmitted to the rear clutch 25R. In this case, if the operator $T^{Fr}_w$ representing a torque of the right front wheel 1Fr and the operator $T^{Fl}_w$ representing a torque of the left front wheel 1Fl are identical to each other, the command signal to engage completely is transmitted to the front clutch 25F. By contrast, if the operator $T^{Fr}_w$ and the operator $T^{Fl}_w$ are different from each other, the command signal to disengage completely (that is, to reduce a torque transmitting capacity to zero) is transmitted to the front clutch 25F.

Figure 8:
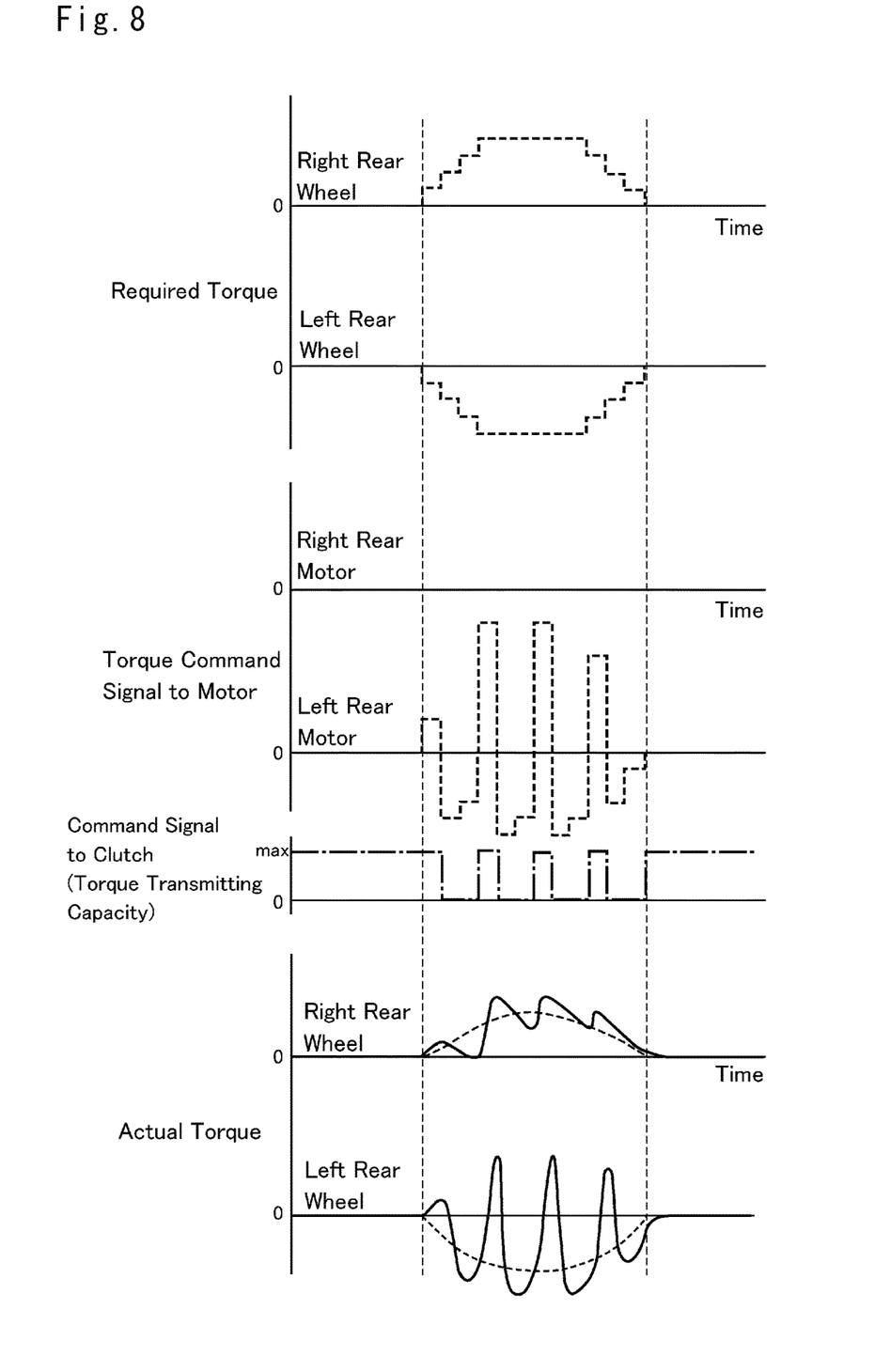
FIG. 8 is a time chart indicating temporal changes in command signals to the motors and a rear clutch, and actual torques of rear wheels, in a case of turning the vehicle to the left and then propels straight ahead in the event of failure of a right rear motor.

FIG. 8 shows temporal changes in the command signals to the pair of rear motors 4Rr and 4Rl and the rear clutch 25R and temporal changes in the actual torques of the pair of rear wheels 3Rr and 3Rl, in a case of turning to the left and then propels straight ahead in the event of failure of the right rear motor 4Rr. In addition, temporal changes in the required torques of the pair of rear wheels 3Rr and 3Rl are also indicated in FIG. 8.

As indicated in FIG. 8, while the vehicle Ve is turning to the left, the required torque of the right rear wheel 3Rr as the outer wheel increases gradually, and then decreases gradually to propel the vehicle Ve straight ahead. On the other hand, the required torque of the left rear wheel 3Rl as the inner wheel decreases gradually, and then increases gradually to propel the vehicle Ve straight ahead.

In this situation, since the right rear motor 4Rr is in failure, the torque command signal to the right rear motor 4Rr is zero throughout the situation shown in FIG. 8. On the other hand, the output torque of the left rear motor 4Rl is set by the procedures shown in FIG. 6. Consequently, the torque command signal to the left rear motor 4Rl is periodically shifted among a command signal to generate a high torque, a command signal to generate a low torque lower than the required torque of the left rear wheel 3Rl, and a command signal to generate a required torque of the left rear wheel 3Rl. In other words, the torque command signal to the left rear motor 4Rl fluctuates periodically.

Meanwhile, the torque transmitting capacity of the rear clutch 25R is increased to the maximum value while the torque command signal to the left rear motor 4Rl is set to the high torque, and reduced to 0 Nm while the torque command signal to the left rear motor 4Rl is set to the low torque and to the required torque of the left rear wheel 3Rl. That is, the torque transmitting capacity of the rear clutch 25R is increased to the maximum value intermittently.

By thus controlling the left rear motor 4Rl and the rear clutch 25R, the actual torque of the right rear wheel 3Rr is changed in a wavelike fashion while approximating the required torque of the right rear wheel 3Rr indicated by the dashed curve. On the other hand, the actual torque of the left rear wheel 3Rl is changed in a wavelike fashion while approximating the required torque of the left wheel 3Rl indicated by the dashed curve.

Thus, in the event of failure of one of the motors in the pair of motors, the output torque of the motor paired with the faulty motor is increased, and the torque transmitting capacity of the clutch interposed between the pair of motors is set in accordance with the required torque of the wheel coupled to the faulty motor. According to the embodiment, therefore, the actual drive torques delivered to the pair of wheels coupled respectively to the pair of motors including the faulty motor will not be changed significantly from the required torques even in the event of failure of one of the motors in the pair of motors. For this reason, the running stability and the driving performance of the vehicle can be ensured.

Specifically, when the required torque of the wheel coupled to the faulty motor is greater than the required torque of the wheel paired with the wheel coupled to the faulty motor, the motor paired with the faulty motor generated the high torque and the low torque alternately. In this situation, the clutch interposed between the pair of motors is engaged while the motor paired with the faulty motor generates the high torque, and disengaged while the motor paired with the faulty motor generates the low torque. According to the embodiment, therefore, the actual drive torques delivered to the pair of wheels coupled respectively to the pair of motors including the faulty motor will not be changed significantly from the required torques even in the event of failure of one of the motors in the pair of motors required to generate a high torque. For this reason, the running stability and the driving performance of the vehicle can be ensured.

Although the above exemplary embodiments of the present disclosure have been described, it will be understood by those skilled in the art that the present disclosure should not be limited to the described exemplary embodiments, and various changes and modifications can be made within the scope of the present disclosure. For example, the drive force control system according to the embodiment may also be applied to a vehicle in which any one of pairs of wheels are driven, instead of the four-wheel drive vehicle. In addition, specification of the motors may be not only identical to one another but also different from one another.

What is claimed is:

1. A drive force control system, comprising:
    a right motor coupled to a right wheel of a vehicle;
    a left motor coupled to a left wheel of the vehicle;
    a clutch that allows a torque transmission between the right motor and the left motor, in which a torque transmitting capacity is variable; and
    a controller that controls output torques of the right motor and the left motor,
    wherein the controller is configured to:
        determine that one of the right motor and the left motor cannot generate a required torque due to failure;
        generate a torque by the other one of the right motor and the left motor in the event of failure of said one of the right motor and the left motor;
        control the torque transmitting capacity of the clutch in such a manner as to deliver the output torque of the motor working properly at least partially to the wheel coupled to the faulty motor;
        determine whether the required torque of the wheel coupled to the faulty motor is smaller than the required torque of the wheel coupled to the motor working properly;
        calculate the output torque of the motor working properly based on a total value of the required torque of the right wheel and the required torque of the left wheel in a case that the required torque of the wheel coupled to the faulty motor is smaller than the required torque of the wheel coupled to the motor working properly; and set the torque transmitting capacity of the clutch based on the required torque of the wheel coupled to the faulty motor.

2. The drive force control system as claimed in claim 1, wherein the controller is further configured to guard the output torque of the motor working properly by an upper limit value and a lower limit value.

3. A drive force control system, comprising:
a right motor coupled to a right wheel of a vehicle;
a left motor coupled to a left wheel of the vehicle;
a clutch that allows a torque transmission between the right motor and the left motor, in which a torque transmitting capacity is variable; and
a controller that controls output torques of the right motor and the left motor,
wherein the controller is configured to:
determine that one of the right motor and the left motor cannot generate a required torque due to failure;
generate a torque by the other one of the right motor and the left motor in the event of failure of said one of the right motor and the left motor;
control the torque transmitting capacity of the clutch in such a manner as to deliver the output torque of the motor working properly at least partially to the wheel coupled to the faulty motor;
determine whether the required torque of the wheel coupled to the faulty motor is greater than the required torque of the wheel coupled to the motor working properly;
execute a pulse control to generate a high torque and a low torque alternately by the motor working properly in a case that the required torque of the wheel coupled to the faulty motor is greater than the required torque of the wheel coupled to the motor working properly; and
execute an intermittent control to increase the torque transmitting capacity of the clutch when the motor working properly generates the high torque, and reduce the torque transmitting capacity of the clutch when the motor working properly generates the low torque.

4. The drive force control system as claimed in claim 3, wherein the high torque includes a torque obtained by multiplying the required torque of the wheel coupled to the faulty motor by predetermined times.

5. The drive force control system as claimed in claim 3, wherein the low torque includes a torque lower than the required torque of the wheel coupled to the motor working properly.

6. The drive force control system as claimed in claim 5, wherein the low torque includes a negative torque that reduces a rotational speed of the wheel coupled to the motor working properly.

7. The drive force control system as claimed in claim 5, wherein the controller is further configured to calculate the low torque based on the required torque and an inertia torque of the wheel coupled to the motor working properly.

8. The drive force control system as claimed in claim 3, wherein the pulse control includes a control to periodically shift the output torque of the motor working properly among the high torque, the low torque, and the required torque of the wheel coupled to the motor working properly.

9. The drive force control system as claimed in claim 3, wherein the right wheel includes a right rear wheel, and wherein the left wheel includes a left rear wheel.

10. The drive force control system as claimed in claim 3, wherein the controller is further configured to guard the output torque of the motor working properly by an upper limit value and a lower limit value.

\* \* \* \* \*